United States Patent
Song et al.

(10) Patent No.: US 11,580,979 B2
(45) Date of Patent: Feb. 14, 2023

(54) METHODS AND SYSTEMS FOR PUSHING AUDIOVISUAL PLAYLIST BASED ON TEXT-ATTENTIONAL CONVOLUTIONAL NEURAL NETWORK

(71) Applicant: Chongqing University, Chongqing (CN)

(72) Inventors: Yongduan Song, Chongqing (CN); Junfeng Lai, Chongqing (CN); Xin Zhou, Chongqing (CN)

(73) Assignee: Chongqing University, Chongqing (CN)

( * ) Notice: Subject to any disclaimer, the term of this patent is extended or adjusted under 35 U.S.C. 154(b) by 173 days.

(21) Appl. No.: 17/141,592

(22) Filed: Jan. 5, 2021

(65) Prior Publication Data

US 2021/0350800 A1 Nov. 11, 2021

(30) Foreign Application Priority Data

May 7, 2020 (CN) .......................... 202010375669.4

(51) Int. Cl.
*G10L 15/22* (2006.01)
*G06F 40/35* (2020.01)
(Continued)

(52) U.S. Cl.
CPC ............ *G10L 15/22* (2013.01); *G06F 40/205* (2020.01); *G06F 40/35* (2020.01); *G10L 13/02* (2013.01);
(Continued)

(58) Field of Classification Search
CPC ..... G06F 40/30; G06F 16/40; H04N 21/2625; G10L 13/00; G10L 25/54; G10L 15/22; G10L 15/26
See application file for complete search history.

(56) References Cited

U.S. PATENT DOCUMENTS

2017/0017649 A1* 1/2017 Srinivasaraghavan .. G06N 3/08
2017/0228385 A1* 8/2017 Zheng .................. G06N 3/0454

FOREIGN PATENT DOCUMENTS

| CN | 107918653 A | * 4/2018 | .......... G06F 16/433 |
| CN | 108959429 A | * 12/2018 | |
| CN | 109388731 A | * 2/2019 | |

OTHER PUBLICATIONS

Abdul, Ashu, et al. "An emotion-aware personalized music recommendation system using a convolutional neural networks approach. "Applied Sciences 8.7 (2018): 1103.*

(Continued)

*Primary Examiner* — Paras D Shah
(74) *Attorney, Agent, or Firm* — Cook Alex Ltd.

(57) ABSTRACT

In some embodiments, methods and systems for pushing audiovisual playlists based on a text-attentional convolutional neural network include a local voice interactive terminal, a dialog system server and a playlist recommendation engine, where the dialog system server and the playlist recommendation engine are respectively connected to the local voice interactive terminal. In some embodiments, the local voice interactive terminal includes a microphone array, a host computer connected to the microphone array, and a voice synthesis chip board connected to the microphone array. In some embodiments, the playlist recommendation engine obtains rating data based on a rating predictor constructed by the neural network; the host computer parses the data into recommended playlist information; and the voice terminal synthesizes the results and pushes them to a user in the form of voice.

3 Claims, 6 Drawing Sheets

(51) Int. Cl.
  *G10L 13/02*      (2013.01)
  *G10L 15/16*      (2006.01)
  *H04N 21/262*     (2011.01)
  *G06F 40/205*     (2020.01)
  *G10L 15/18*      (2013.01)
  *G10L 15/30*      (2013.01)
  *H04R 3/00*       (2006.01)

(52) U.S. Cl.
  CPC .......... *G10L 15/16* (2013.01); *G10L 15/1815* (2013.01); *G10L 15/30* (2013.01); *H04N 21/26258* (2013.01); *H04R 3/005* (2013.01); *G10L 2015/223* (2013.01)

(56) References Cited

OTHER PUBLICATIONS

Lu, Yichao, Ruihai Dong, and Barry Smyth. "Coevolutionary recommendation model: Mutual learning between ratings and reviews." Proceedings of the 2018 World Wide Web Conference. 2018.*

Jhamb, Yogesh. Machine Learning Models for Context-Aware Recommender Systems. Diss. Santa Clara University, 2018.*

Zhang, Shuai, et al. "Deep learning based recommender system: A survey and new perspectives." ACM Computing Surveys (CSUR) 52.1 (2019): 1-38.*

Wang, Hongwei, et al. "DKN: Deep knowledge-aware network for news recommendation." Proceedings of the 2018 world wide web conference. 2018.*

Da'u, Aminu, and Naomie Salim. "Sentiment-aware deep recommender system with neural attention networks." IEEE Access 7 (2019): 45472-45484.*

Guo, Yupu, et al. "A joint neural network for session-aware recommendation." IEEE Access 8 (2020): 74205-74215.*

* cited by examiner

METHODS AND SYSTEMS FOR PUSHING AUDIOVISUAL PLAYLIST BASED ON TEXT-ATTENTIONAL CONVOLUTIONAL NEURAL NETWORK

CROSS-REFERENCE TO RELATED APPLICATION(S)

This application claims priority benefits to Chinese Patent Application No. 202010375669.4, entitled "Methods and Systems for Pushing Audiovisual Playlist Based On Text-Attentional Convolutional Neural Network" filed with the China National Intellectual Property Administration on May 7, 2020.

The '669.4 application is incorporated herein by reference in its entirety.

FIELD OF THE INVENTION

The present disclosure relates to the technical field of smart voice interaction and machine learning (ML), and in particular to a method and system for pushing an audiovisual playlist to a user through voice interaction.

In the era of information explosion, information overload plagues peoples' daily lives. Even the most advanced information retrieval systems can create information overload as the number of results they retrieve are often huge. In current interactive information recommendation systems, information is generally pushed after a user actively subscribes, and is not recommended according to the user's real concerns and/or points of interest. These passive interactive recommendation systems fail to meet the diverse needs of people in daily life. A way of improving retrieval accuracy, filtering redundant information, and/or providing users with the information they are really interested in is needed.

SUMMARY OF THE INVENTION

The present disclosure provides methods and systems for pushing an audiovisual playlist based on a text-attentional convolutional neural network (Text-CNN). Passive interactive recommendation systems offer poor interaction between a user and a viewing system and cannot provide a user with a personalized playlist push service.

In at least some embodiments, a method for pushing an audiovisual playlist based on a text-attentional convolutional neural network (Text-CNN), includes the steps of:

(A) constructing a user information database and an audiovisual information database;

(B) processing an audiovisual introduction text in the audiovisual information database by using a text digitization technique to obtain fully digital structured data, using the fully digital structured data as an input into the text-CNN, and calculating a hidden feature of the audiovisual introduction text by the following equation:

$$\begin{cases} Z_w = \tanh(WX_w + p) \\ y_w = KZ_w + q \end{cases} \quad (1)$$

where, W is a feature extraction weight coefficient of an input layer of the text-CNN; K is a feature extraction weight coefficient of a hidden layer; $W \in R^{n_h \times (n-1)m}$; $P \in R^{n_h}$; $K \in R^{n_h \times N}$; $q \in R^N$; a projection layer $X_w$ is a vector composed of n−1 word vectors of the input layer, with a length of (n−1)m; calculating $y_w = \{Y_{w,1}, y_{w,2}, \ldots, y_{w,N}\}$, then letting $w_i$ represent a word in a corpus Context($w_i$) composed of the audiovisual introduction text, and normalizing by a softmax function to obtain a similarity probability of word $w_i$ in a user rating of a movie:

$$p(w \mid \text{Context}(w)) = \frac{e^{y_{w,i_w}}}{\sum_{i=1}^{N} e^{y_{w,i}}} \quad (2)$$

where, $i_w$ represents an index of word w in corpus Context ($w_i$); $y_{w,i_w}$ represents a probability that word w is indexed as $i_w$ in corpus Context($w_i$) when the corpus is Context(w);

letting the obtained hidden feature of an audiovisual introduction text be F in an entire convolution process, $F = \{F_1, F_2, \ldots, F_D\}$ and letting $F_j$ be a jth hidden feature of the audiovisual introduction, then:

$$F_j = \text{text\_cnn}(W, X) \quad (3)$$

where, W is the feature extraction weight coefficient of the input layer of the text-CNN; X is a probability matrix after the digitization of the audiovisual introduction text;

(C) extracting a rating feature of probability matrix X by a convolutional layer of the text-CNN, and setting the size of a convolution window to D×L;

amplifying and extracting, by a max-pooling layer, a feature processed by the convolutional layer and affecting a user's rating into several feature maps, that is, using N one-dimensional (1D) vectors $H_N$ as an input in a fully connected layer;

mapping, by the fully connected layer and an output layer, a 1D digital vector representing main feature information of a movie into a D-dimensional hidden feature matrix V of movies about user rating;

(D) counting historical initial rating information of users from an open dataset Movielens 1 m, and obtaining a digital rating matrix of [0,5] according to a normalization function, where N represents a user set; M represents a movie set; $R_{ij}$ represents a rating matrix of user $u_i$ about movie $m_j$; $R = [R_{ij}]_{m \times n}$ represents an overall initial rating matrix of users; decomposing R into a hidden feature matrix $U \in R^{D \times N}$ of user rating and a hidden feature matrix $V \in R^{D \times N}$ of movies;

calculating a user similarity $uSim(u_i, u_j)$, and classifying a user with a similarity greater than 0.75 as a neighboring user;

$$uSim(u_i, u_j) = \frac{\sum_{m \in R^M} (r_{u_i,m} - \bar{r}_m)(r_{u_j,m} - \bar{r}_m)}{\sqrt{\sum_{m \in R^M} (r_{u_i,m} - \bar{r}_m)^2} \sqrt{\sum_{m \in R^M} (r_{u_j,m} - \bar{r}_m)^2}} \quad (4)$$

where, $R^M$ represents a set of movies with rating results; $u_i, u_j$ are users participating in the rating; $r_{u_i,m}$ represents the rating of movie m by user $u_i$; $\bar{r}_m$ represents a mean of the rating;

(E) subjecting the overall initial rating matrix R of users to model-based probability decomposition, where $\sigma_U$ is a variance of a hidden feature matrix of users obtained by decomposing $R_{ij}$; $\sigma_V$ is a variance of a hidden feature matrix of movies obtained by decomposing $R_{ij}$; constructing a potential rating matrix $\tilde{R} = [\tilde{R}_{ij}]^{m \times n}$ of users as a user rating predictor, $\tilde{R}_{ij} = U_i^T F_j$, specifically: constructing a probability density function for the overall initial rating matrix R of users as follows:

$$p(U, V \mid R, \sigma^2, \sigma_V^2, \sigma_U^2) = \prod_{i=1}^{N}\prod_{j=1}^{M} I_{ij}\ln[N(R_{ij} \mid U_i^T V_j, \sigma^2)] + \qquad (5)$$

$$\prod_{i=1}^{N}\ln N(U_i \mid 0, \sigma_U^2 I) + \prod_{j=1}^{M}\ln N(V_i \mid 0, \sigma_V^2 I)$$

where, N is a zero mean Gaussian distribution probability density function; σ is a variance of the overall initial rating matrix of users; I is a marking function regarding whether a user rates after watching a movie;

iteratively updating U and V by using a gradient descent method until a loss function E converges, so as to obtain a hidden feature matrix that best represents the user and the movie in a fitting process:

$$E = \frac{1}{2}\sum_{i=1}^{N}\sum_{j=1}^{M} I_{ij}(R_{ij} - U_i^T F_j)^2 + \frac{\phi^2}{2\phi_U^2}\sum_{i=1}^{N}\|U_i\|^2 + \frac{\phi^2}{2\phi_F^2}\sum_{j=1}^{M}\|F_j\|^2 \qquad (6)$$

where, $I_{ij}$ is a marking function regarding whether user i participates in rating movie j; if yes, $I_{ij}$ is 1, otherwise $I_{ij}$ is 0; φ, $\phi_U$ and $\phi_F$ are regularization parameters to prevent overfitting;

using the loss function E and the gradient descent method to calculate the hidden feature matrix U of users and the hidden feature matrix V of movies:

$$\frac{\partial E}{\partial U} = -V + \phi_U U \qquad (7)$$

$$\frac{\partial E}{\partial V} = -U + \phi_V V$$

iteratively updating to calculate the hidden feature matrix U of users and the hidden feature matrix V of movies until E converges:

$$U = U + \rho(V - \phi_U U)$$

$$V = V + \rho(V - \phi_V V) \qquad (8)$$

where, ρ represents a learning rate;

(F) saving an algorithm model after training by step (E) as a model file, where the model file is called in a service program of a playlist push engine; and (G) defining a semantic slot for a smart audiovisual playlist scene in a dialog server, and triggering an entity related to the audiovisual playlist and defined in the semantic slot to enable an audiovisual playlist recommendation function when a voice dialog with a neighboring user is conducted in the smart audiovisual playlist scene.

In at least some embodiments, the present disclosure provides systems for pushing an audiovisual playlist according to a method for pushing an audiovisual playlist based on a Text-CNN, including a local voice interactive terminal, a dialog system server and a playlist recommendation engine, where the dialog system server and the playlist recommendation engine are respectively connected to the local voice interactive terminal.

In at least some embodiments, the local voice interactive terminal includes a microphone array, a host computer and a voice synthesis chip board; the microphone array is connected to the voice synthesis chip board; the voice synthesis chip board is connected to the host computer; the host computer is connected to the dialog system server; and/or the playlist recommendation engine is connected to the voice synthesis chip board.

In at least some embodiments, the microphone array is used to collect a user's voice information and transmit the collected voice information to the host computer; the host computer processes the voice information and sends the processed voice information to the dialog system server; the dialog system server generates appropriate dialog text information through semantic matching based on the voice information sent by the host computer, and sends the dialog text information to the host computer via a transmission control protocol/Internet protocol (TCP/IP); the host computer parses the dialog text information sent by the dialog system server, and sends the parsed dialog text information to the voice synthesis chip board; and/or the voice synthesis chip board converts the dialog text information into voice information and sends the voice information to the microphone array to broadcast to the user.

In at least some embodiments, the playlist recommendation engine is used to generate audiovisual playlist information for the dialog user according to the user's dialog information, and transmit the audiovisual playlist information to the voice synthesis chip board via the TCP/IP protocol; the voice synthesis chip board generates a voice playlist push message according to the audiovisual playlist information and sends the voice playlist push message to the microphone array to broadcast to the user.

In at least some embodiments, the methods and systems for pushing an audiovisual playlist based on a Text-CNN can realize convenient interaction with users and avoid shortcomings of traditional inconvenient interactive methods such as user interfaces (UI) and manual clicks. The methods and systems can realize effective integration with other software and hardware services with voice control as the core in smart home scenes such as movies on demand, which provide users with more convenient services while satisfying users' personalized requirements for movies on demand, etc. The methods and systems can help products and/or services have a deeper understanding of users' needs based on the original basic design and timely adjust the output results.

DETAILED DESCRIPTION OF ILLUSTRATIVE EMBODIMENT(S)

The present disclosure is described in further detail below with reference to the accompanying drawings and embodiments.

Some embodiments provide methods for pushing an audiovisual playlist based on a text-attentional convolutional neural network (Text-CNN). The methods can include the following steps:

(A) Constructing a user information database and an audiovisual information database. Specifically, a user's basic information can be recorded in a MySQL database through a user information collection module to form the user information database, and a PySpider environment can be set up to capture movie information to a mongodb database to form the audiovisual information database.

Figure 2:
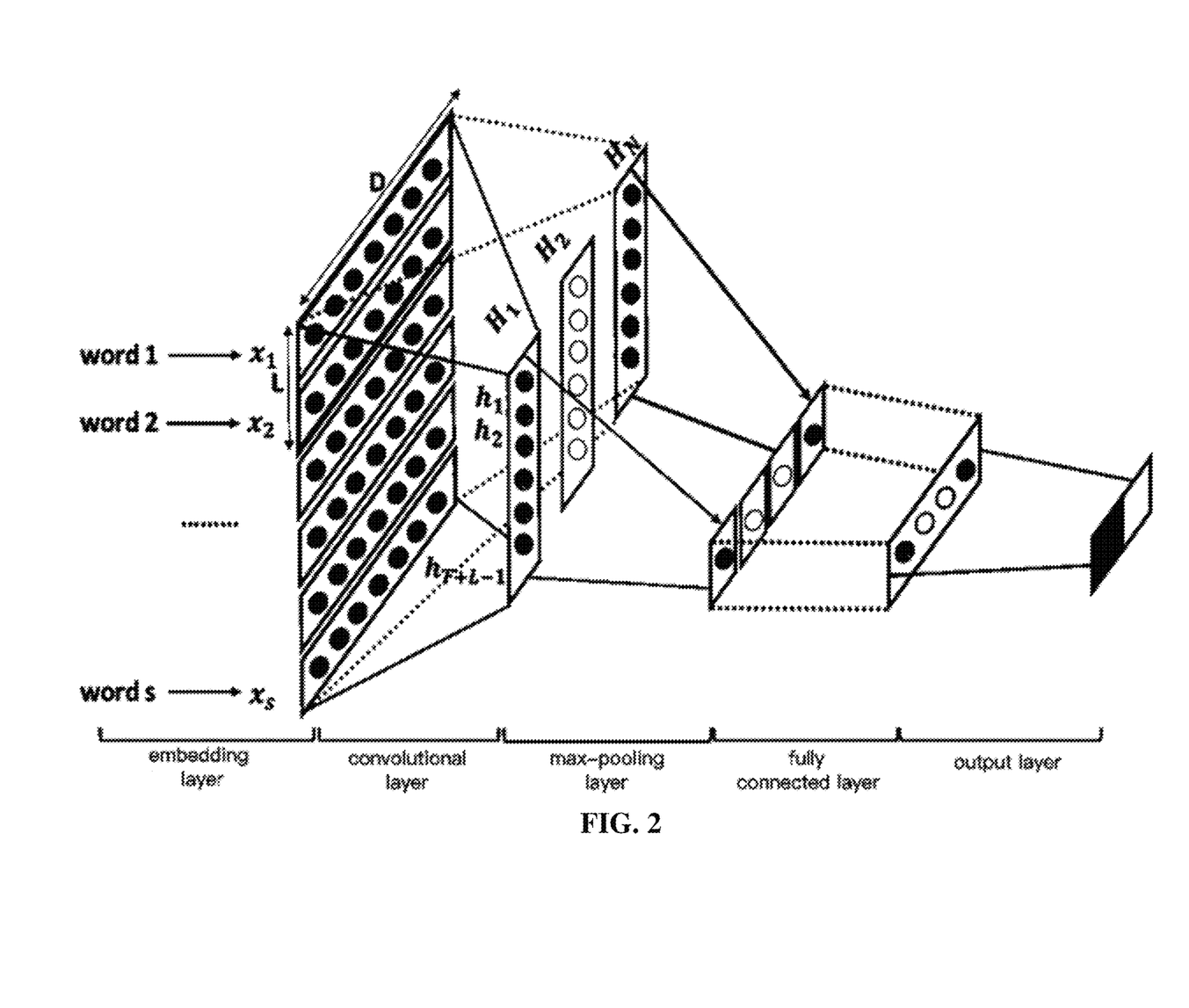
FIG. 2 is a schematic diagram of a Text-CNN according to some embodiments.
Figure 3:
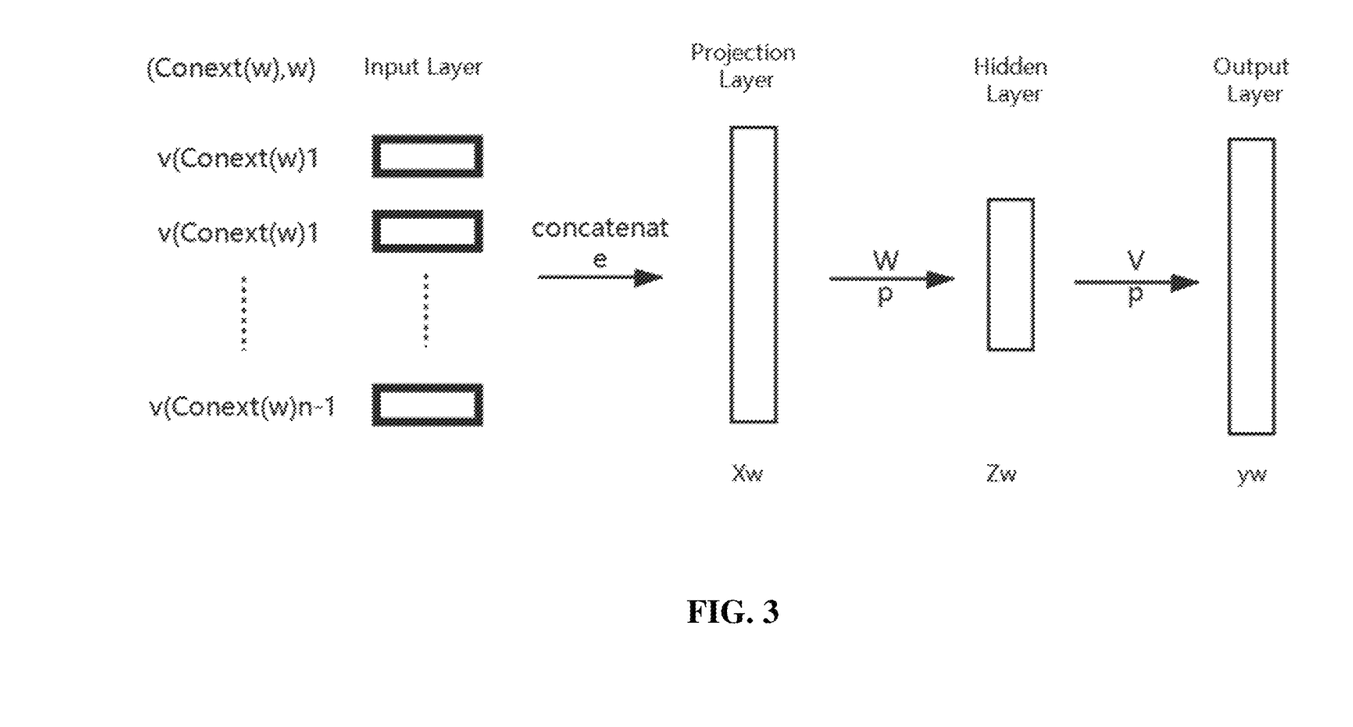
FIG. 3 illustrates a process of extracting feature information of an audiovisual text according to some embodiments.

(B) Processing an audiovisual introduction text in the audiovisual information database by using a text digitization technique to obtain fully digital structured data, using the fully digital structured data as an input into the text-CNN, and calculating a hidden feature of the audiovisual introduction text by the following equation:

$$\begin{cases} z_w = \tanh(WX_w + p), \\ y_w = Kz_w + q, \end{cases} \quad (1)$$

In the equation, W is a feature extraction weight coefficient of an input layer of the text-CNN; K is a feature extraction weight coefficient of a hidden layer; $W \in R^{n_h \times (n-1)m}$; $p \in R^{n_h \times N}$; $q \in R^N$; a projection layer $X_w$ is a vector composed of n−1 word vectors of the input layer, with a length of (n−1)m.

Calculating $y_w = \{y_{w,1}, Y_{w,2}, \ldots, y_{w,N}\}$, then letting $w_i$ represent a word in a corpus Context($w_i$) composed of the audiovisual introduction text, and normalize by a softmax function to obtain a similarity probability of word $w_i$ in a user rating of a movie:

$$p(w \mid \text{Context}(w)) = \frac{e^{y_{w,i_w}}}{\sum_{i=1}^{N} e^{y_{w,i}}}. \quad (2)$$

In the equation, $i_w$ represents an index of word w in corpus Context($w_i$); $y_{w,i_w}$ represents a probability that word w is indexed as $i_w$ in corpus Context($w_i$) when the corpus is Context(w).

Letting the obtained hidden feature of an audiovisual introduction text be F in an entire convolution process, $F = \{F_1, F_2, \ldots, F_D\}$ and letting $F_j$ be a jth hidden feature of the audiovisual introduction, then:

$$F_j = \text{text\_cnn}(W, X) \quad (3).$$

In the equation, W is the feature extraction weight coefficient of the input layer of the text-CNN; X is a probability matrix after the digitization of the audiovisual introduction text.

(C) Extracting a rating feature of probability matrix X by a convolutional layer of the text-CNN, and setting the size of a convolution window to D×L; amplifying and extracting, by a max-pooling layer, a feature processed by the convolutional layer and affecting a user's rating after the processing of into several feature maps, that is, using N one-dimensional (1D) vectors $H_N$ as an input in a fully connected layer; finally, mapping, by the fully connected layer and an output layer, a 1D digital vector representing main feature information of a movie into a D-dimensional hidden feature matrix V of movies about user rating.

Figure 4:
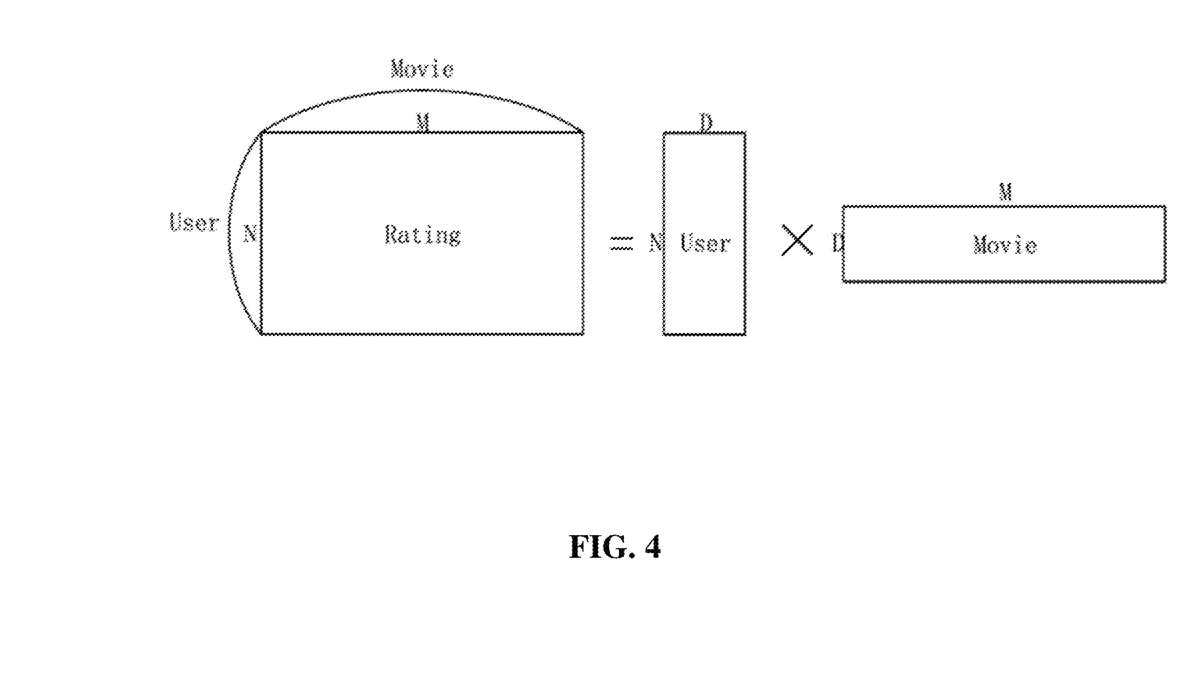
FIG. 4 illustrates a decomposition process of user and movie information matrixes according to some embodiments.

(D) Counting historical initial rating information of users from an open dataset Movielens 1 m, and obtaining a digital rating matrix of [0,5] according to a normalization function, where N represents a user set; M represents a movie set; $R_{ij}$ represents a rating matrix of user $u_i$ about movie $m_j$; $R = [R_{ij}]_{m \times n}$ represents an overall initial rating matrix of users; decomposing R into a hidden feature matrix $U \in R^{D \times N}$ of user rating and a hidden feature matrix $V \in R^{D \times N}$ of movies, where the feature matrix has D dimensions; then, calculating a user similarity, and classifying a user with a similarity greater than 0.75 as a neighboring user;

$$uSim(u_i, u_j) = \frac{\sum_{m \in R^M} (r_{u_i,m} - \bar{r}_m)(r_{u_j,m} - \bar{r}_m)}{\sqrt{\sum_{m \in R^M} (r_{u_i,m} - \bar{r}_m)^2} \sqrt{\sum_{m \in R^M} (r_{u_j,m} - \bar{r}_m)^2}}. \quad (4)$$

In the equation, $R^M$ represents a set of movies with rating results; $u_i$, $u_j$ of are users participating in the rating; $r_{u_i}^m$ represents the rating of movie m by user $u_i$; $\bar{r}_m$ represents a mean of the rating.

Figure 5:
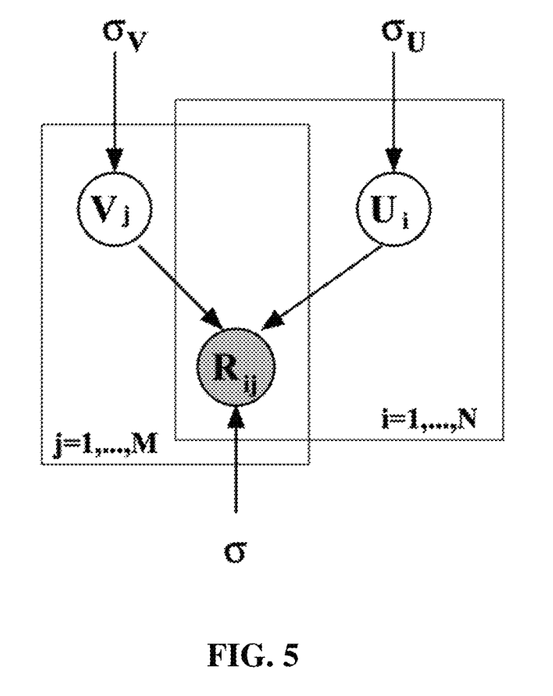
FIG. 5 is a schematic diagram of a probability model introduced to the matrix decomposition process according to some embodiments.

(E) Subjecting the overall initial rating matrix R of users to model-based probability decomposition, where $\sigma_U$ is a variance of a hidden feature matrix of users obtained by decomposing $R_{ij}$; $\sigma_V$ is a variance of a hidden feature matrix of movies obtained by decomposing $R_{ij}$; construct a potential rating matrix $\tilde{R} = [\tilde{R}_{ij}]_{m \times n}$ of users as a user rating predictor, $\acute{R}_{ij} = U_i^T F_j$, specifically:

Constructing a probability density function for the overall initial rating matrix R of users as follows:

$$p(U, V \mid R, \sigma^2, \sigma_V^2, \sigma_U^2) = \prod_{i=1}^{N} \prod_{j=1}^{M} I_{ij} \ln[N(R_{ij} \mid U_i^T V_j, \sigma^2)] + \quad (5)$$

$$\prod_{i=1}^{N} \ln N(U_i \mid 0, \sigma_U^2 I) + \prod_{j=1}^{M} \ln N(V_i \mid 0, \sigma_V^2 I).$$

In the equation, N is a zero mean Gaussian distribution probability density function; σ is a variance of the overall initial rating matrix of users; I is a marking function regarding whether a user rates after watching a movie.

Iteratively updating U and V by using a gradient descent method until a loss function E converges, so as to obtain a hidden feature matrix that best represents the user and the movie in a fitting process:

$$E = \frac{1}{2} \sum_{i=1}^{N} \sum_{j=1}^{M} I_{ij}(R_{ij} - U_i^T F_j)^2 + \frac{\phi^2}{2\phi_U^2} \sum_{i=1}^{N} \|U_i\|^2 + \frac{\phi^2}{2\phi_F^2} \sum_{j=1}^{M} \|F_j\|^2. \quad (6)$$

In the equation, $I_{ij}$ is a marking function regarding whether user i participates in rating movie j; if yes, $I_{ij}$ is 1, otherwise $I_{ij}$ is 0; φ, $\phi_U$ and $\phi_F$ are regularization parameters to prevent overfitting.

Using the loss function E and the gradient descent method to calculate the hidden feature matrix U of users and the hidden feature matrix V of movies:

$$\frac{\partial E}{\partial U} = -V + \phi_U U \quad (7)$$

$$\frac{\partial E}{\partial V} = -U + \phi_V V.$$

Iteratively updating to calculate the hidden feature matrix U of users and the hidden feature matrix V of movies until E converges:

$$U = U + \rho(V - \phi_U U)$$

$$V = V + \rho(V - \phi_V V) \quad (8).$$

In the equation, ρ represents a learning rate. In this embodiment, ρ is 0.25.

(F) Saving an algorithm model after training by step (E) as a model file. In some embodiments, a Tensorflow deep learning (DL) library is used to save the algorithm model trained in step (E) as a Tensorflow model file, which is called in a service program of a playlist push engine.

(G) Defining a semantic slot for a smart audiovisual playlist scene in a dialog server, and triggering an entity related to the audiovisual playlist and defined in the semantic slot to enable an audiovisual playlist recommendation function when a voice dialog with a neighboring user is conducted in the smart audiovisual playlist scene.

Figure 1:
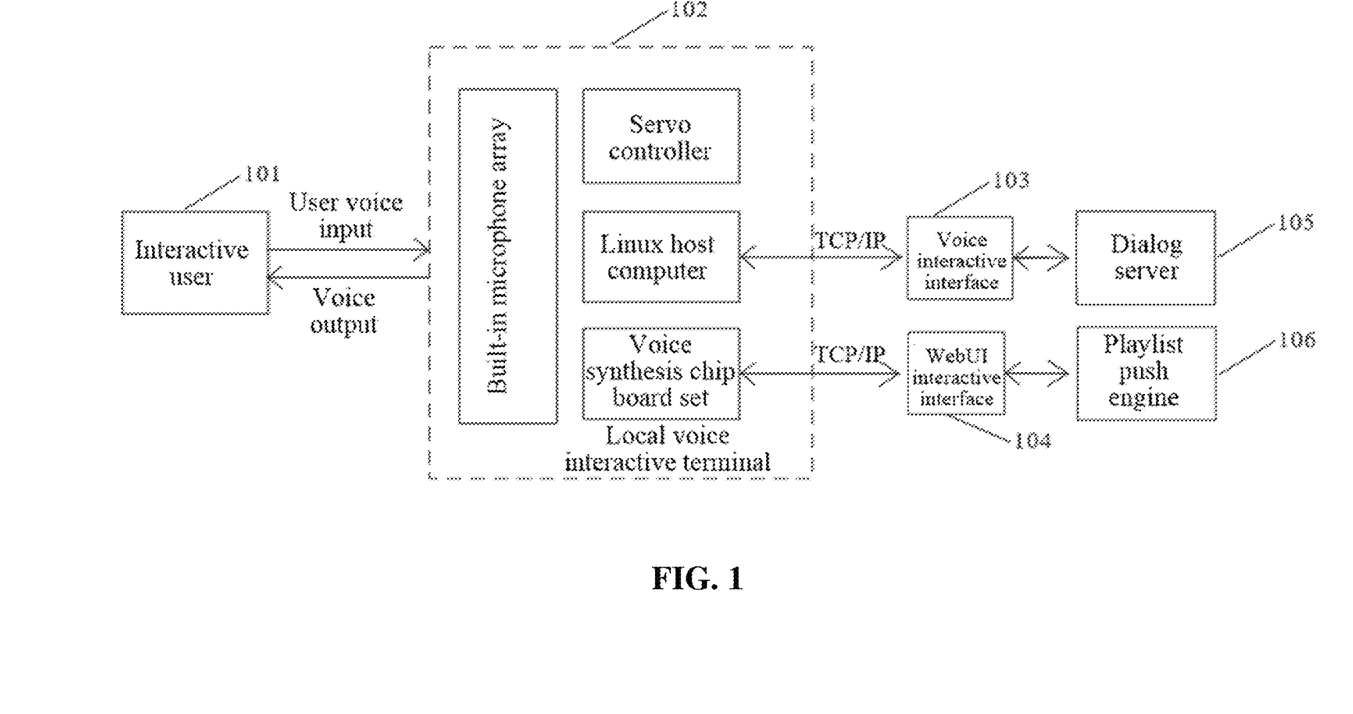
FIG. 1 is a schematic diagram of a system for pushing an audiovisual playlist based on a Text-CNN according to some embodiments.

Some embodiments provide a system for pushing an audiovisual playlist according to a Text-CNN-based method for pushing an audiovisual playlist to interactive user 101. In some embodiments, the systems can include local voice interactive terminal 102, dialog system server 105 and playlist recommendation engine 106, where dialog system server 105 and playlist recommendation engine 106 are respectively connected to local voice interactive terminal 102.

Local voice interactive terminal 102 can include a microphone array, a host computer and/or a voice synthesis chip board. In some embodiments, the voice synthesis chip board is connected with the host computer, and the host computer is a Linux host computer. In some of these embodiments, the microphone array is connected to the voice synthesis chip board and the host computer. The host computer can be connected to dialog system server 105 through voice interactive interface 103. The voice synthesis chip board can be connected to playlist recommendation engine 106 through a Website User Interface (WebUI) or user interface (UI) interactive interface 104 and can be used for intuitive display of a recommended playlist.

The microphone array can be used to collect a user's voice information and transmit the collected voice information to the host computer. In at least some embodiments, the host computer can process the voice information and send the processed voice information to the dialog system server.

Figure 6:
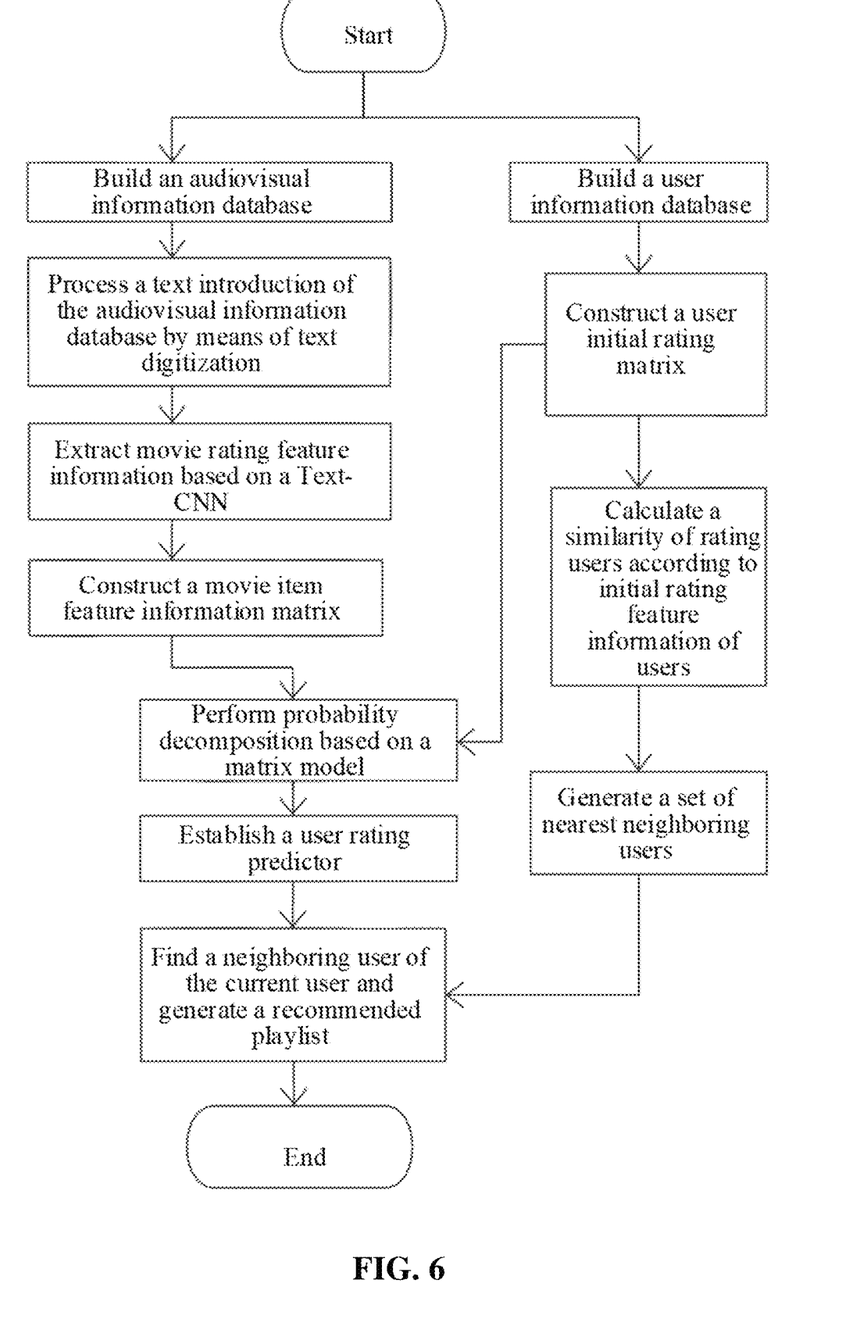
FIG. 6 is a working process of a system for pushing an audiovisual playlist based on a Text-CNN according to some embodiments.

In at least some embodiments, dialog system server 105 generates appropriate dialog text information through semantic matching based on the voice information sent by the host computer, and sends the dialog text information to the host computer via a transmission control protocol/Internet protocol (TCP/IP). The host computer parses the dialog text information sent by dialog system server 105 and sends the parsed dialog text information to the voice synthesis chip board. The voice synthesis chip board can convert the dialog text information into voice information and send the voice information to the microphone array to broadcast to the user.

In at least some embodiments, playlist recommendation engine 106 is used to generate audiovisual playlist information for the dialog user according to the user's dialog information, and transmit the audiovisual playlist information to the voice synthesis chip board via the TCP/IP protocol. The voice synthesis chip board can generate a voice playlist push message according to the audiovisual playlist information and send the voice playlist push message to the microphone array to broadcast to the user.

In at least some embodiments, the methods and systems for pushing an audiovisual playlist based on a Text-CNN in the present disclosure realize convenient interaction with users and avoids the shortcomings of traditional inconvenient interactive methods such as UI and manual click. In at least some embodiments, the present disclosure realizes effective integration with other software and hardware services with voice control as the core in smart home scenes such as movies on demand, which provides users with more convenient services while satisfying users' personalized requirements for movies on demand, etc. The present disclosure can help products or services to have a deeper understanding of user needs based on the original basic design and timely adjust the output results.

It should be noted that the above embodiments are only intended to explain, rather than to limit the technical solutions of the present disclosure. Although the present disclosure is described in detail with reference to the preferred embodiments, those skilled in the art should understand that modifications or equivalent substitutions may be made to the technical solutions of the present disclosure without departing from the spirit and scope of the technical solutions of the present disclosure, and such modifications or equivalent substitutions should be included within the scope of the claims of the present disclosure.

What is claimed is:

1. A method for pushing an audiovisual playlist based on a text-attentional convolutional neural network comprising:
   (A) constructing a user information database and an audiovisual information database;
   (B) processing an audiovisual introduction text in said audiovisual information database comprising
      (i) using a text digitization technique to obtain a fully digital structured data;
      (ii) using said fully digital structured data as an input into said text-attentional convolutional neural network, and
      (iii) calculating a hidden feature of said audiovisual introduction text by a first equation:

$$\begin{cases} z_w = \tanh(WX_w + p), \\ y_w = Kz_w + q, \end{cases}$$

wherein, W is a feature extraction weight coefficient of an input layer of said text-attentional convolutional neural network;
   K is a feature extraction weight coefficient of a hidden layer; $W \in R^{n_h \times (n-1)m}$; $p \in R^{n_h}$; $K \in R^{n_h \times N}$; $q \in R^N$; and a projection layer $X_w$ is a vector composed of n−1 word vectors of the input layer, with a length of (n−1)m ;
   (iv) calculating $y_w = \{y_{w,1}, y_{w,2}, \ldots, y_{w,N}\}$, and letting $W_i$ represent a word in a corpus Context($w_i$) composed of said audiovisual introduction text, and normalizing by a softmax function to obtain a similarity probability of word $w_i$ in a user rating of a movie:

$$p(w|\text{Context}(w)) = \frac{e^{y_{w,i_w}}}{\sum_{i=1}^{N} e^{y_{w,i}}}$$

wherein, $i_w$ represents an index of word w in said corpus Context($w_i$)

$y_{w,j_w}$ represents a probability that word w is indexed as $i_w$ in said corpus Context($w_i$) when said corpus is Context(w);

(v) letting said hidden feature of said audiovisual introduction text be F in an entire convolution process, F={$F_1, F_2, \ldots, F_D$}, and letting $F_j$ be a jth hidden feature of said audiovisual introduction text, then: $F_j$=text_cnn(W,X)

wherein, W is the feature extraction weight coefficient of the input layer of said text-attentional convolutional neural network; X is a probability matrix after digitization of the audiovisual introduction text;

(C) extracting a rating feature of probability matrix X by a convolutional layer of said text-attentional convolutional neural network; setting a size of a convolution window to D×L; amplifying and extracting, by a max-pooling layer, a feature processed by the convolutional layer and affecting a user's rating into several feature maps, that is, using N one- dimensional (1D) vectors $H_N$ as an input in a fully connected layer; and mapping, by the fully connected layer and an output layer, a 1D digital vector representing main feature information of a movie into a D-dimensional hidden feature matrix V of movies about user rating;

(D) counting historical initial rating information of users from an open dataset Movielens 1 m, and obtaining a digital rating matrix of [0,5] according to a normalization function, wherein N represents a user set; M represents a movie set; $R_{ij}$ represents a rating matrix of user $u_i$ about movie $m_j$, R=$[R_{ij}]_{m \times n}$ represents an overall initial rating matrix of users; decomposing R into a hidden feature matrix U∈$R^{D \times N}$ of user rating and a hidden feature matrix V∈$R^{D \times N}$ of movies; then, calculating a user similarity uSim($u_i,u_j$), and classifying a user with a similarity greater than 0.75 as a neighboring user;

$$uSim(u_i, u_j) = \frac{\sum_{m \in R^M}(r_{u_i,m} - \overline{r_m})(r_{u_j,m} - \overline{r_m})}{\sqrt{\sum_{m \in R^M}(r_{u_i,m} - \overline{r_m})^2}\sqrt{\sum_{m \in R^M}(r_{u_j,m} - \overline{r_m})^2}}$$

wherein, $R^M$ represents a set of movies with rating results; $u_i,u_j$ are users participating in the rating; $r_{um}$ represents the rating of movie m by user $u_i$; $\overline{r_m}$ represents a mean of the rating;

(E) subjecting the overall initial rating matrix R of users to model-based probability decomposition, wherein $\sigma_U$ is a variance of a hidden feature matrix of users obtained by decomposing $R_{ij}$; $\sigma_V$ is a variance of a hidden feature matrix of movies obtained by decomposing $R_{ij}$; constructing a potential rating matrix $\overline{R}=[\overline{R}_{ij}]_{m \times n}$ of users as a user rating predictor, $\overline{R}_{ij} = U_i^T F_j$, constructing a probability density function for the overall initial rating matrix R of users as follows:

$$p(U, V \mid R, \sigma^2, \sigma_V^2, \sigma_U^2) =$$

-continued
$$\prod_{i=1}^{N}\prod_{j=1}^{M}I_{ij}\ln[N(R_{ij} \mid U_i^T V_j, \sigma^2)] + \prod_{i=1}^{N}\ln N(U_i \mid 0, \sigma_U^2 I) + \prod_{j=1}^{M}\ln N(V_j \mid 0, \sigma_V^2 I)$$

wherein, N is a zero mean Gaussian distribution probability density function; σ is a variance of the overall initial rating matrix of users; I is a marking function regarding whether a user rates after watching said movie; iteratively updating U and V by using a gradient descent method until a loss function E converges, so as to obtain a hidden feature matrix that best represents the user and the movie in a fitting process:

$$E = \frac{1}{2}\sum_{i=1}^{N}\sum_{j=1}^{M}I_{ij}(R_{ij} - U_i^T F_j)^2 + \frac{\phi^2}{2\phi_U^2}\sum_{i=1}^{N}\|U_i\|^2 + \frac{\phi^2}{2\phi_F^2}\sum_{j=1}^{M}\|F_j\|^2$$

wherein, $I_{ij}$ is a marking function regarding whether user i participates in rating movie j; if yes, $I_{ij}$ is 1, otherwise $I_{ij}$ is 0; $\phi$, $\phi_U$ and $\phi_F$ are regularization parameters to prevent overfitting;

using said loss function E and the gradient descent method to calculate a hidden feature matrix U of users and a hidden feature matrix V of movies:

$$\frac{\partial E}{\partial U} = -V + \phi_U U$$

$$\frac{\partial E}{\partial V} = -U + \phi_V V$$

iteratively updating to calculate said hidden feature matrix U of users and said hidden feature matrix V of movies until E converges:

$U=U+\rho(V-\phi_U U)$ $V=V+\rho(V-\phi_V V)$ wherein, ρ represents a learning rate;

(F) saving an algorithm model based on step (E) as a model file, wherein the model file is called in a service program of a playlist push engine;

(G) defining a semantic slot for a smart audiovisual playlist scene in a dialog server, and triggering an entity related to the audiovisual playlist and defined in the semantic slot;

(H) enabling an audiovisual playlist recommendation function when a voice dialog with said neighboring user is conducted in the smart audiovisual playlist scene; and (I) synthesizing, via a voice synthesis chip board, an audiovisual playlist information based on the voice dialog.

2. A system for pushing an audiovisual playlist comprising:

(A) a local voice interactive terminal comprising:
 (i) a microphone array;
 (ii) a host computer; and
 (iii) a voice synthesis chip board;
(B) a dialog system server; and
(C) a playlist recommendation engine,
wherein said dialog system server and said playlist recommendation engine are respectively connected to said local voice interactive terminal;

wherein said microphone array is connected to said voice synthesis chip board;

wherein said voice synthesis chip board is connected to said host computer;

wherein said host computer is connected to said dialog system server; and said playlist recommendation engine generates audiovisual playlist information according to the method for pushing said audiovisual playlist based on a text-attentional convolutional neural network of claim 1 for a dialog user according to a user's dialog information and transmit said audiovisual playlist information to said voice synthesis chip board via a transmission control protocol/Internet protocol (TCP/IP); and wherein said playlist recommendation engine is connected to said voice synthesis chip board.

3. The system of claim 2 wherein said microphone array is used to collect a user's voice information and transmit said user's voice information to said host computer;

wherein said host computer processes said user's voice information and sends the processed user's voice information to said dialog system server;

said dialog system server generates dialog text information through semantic matching based on said processed user's voice information and sends said dialog text information to said host computer via said TCP/IP;

said host computer parses said dialog text information and sends the parsed dialog text information to said voice synthesis chip board;

said voice synthesis chip board converts said parsed dialog text information into voice information and sends said voice information to said microphone array to broadcast to said user;

said voice synthesis chip board generates a voice playlist push message according to said audiovisual playlist information and sends said voice playlist push message to said microphone array to broadcast to said user.

* * * * *